US010015279B2

(12) United States Patent
Smith et al.

(10) Patent No.: US 10,015,279 B2
(45) Date of Patent: Jul. 3, 2018

(54) APPLICATION ASSIGNMENT RECONCILIATION AND LICENSE MANAGEMENT

(71) Applicant: BlackBerry Limited, Waterloo (CA)

(72) Inventors: Andrew Christopher Smith, Oakville (CA); Haseem Ul Haq Kheiri, Brampton (CA); Qiusheng Wang, Burlington (CA); Paul Douglas Morley, Corinth, TX (US); Kelsey McKinnon Smith, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 452 days.

(21) Appl. No.: 14/617,623

(22) Filed: Feb. 9, 2015

(65) Prior Publication Data

US 2016/0142511 A1 May 19, 2016

Related U.S. Application Data

(60) Provisional application No. 62/079,404, filed on Nov. 13, 2014.

(51) Int. Cl.

| | |
|---|---|
| ***G06F 15/173*** | (2006.01) |
| ***H04L 29/08*** | (2006.01) |
| ***G06Q 30/06*** | (2012.01) |

(52) U.S. Cl.
CPC ........... *H04L 67/327* (2013.01); *G06Q 30/06* (2013.01); *H04L 67/02* (2013.01)

(58) Field of Classification Search
CPC ........ H04L 67/327; H04L 67/02; G06Q 30/06
See application file for complete search history.

(56) References Cited

U.S. PATENT DOCUMENTS

| | | | |
|---|---|---|---|
| 4,937,863 | A | 6/1990 | Robert |
| 6,574,612 | B1 | 6/2003 | Baratti |
| 7,370,017 | B1 | 5/2008 | Lindeman |

(Continued)

OTHER PUBLICATIONS

International Search Report and Written Opinion issued by International Searching Authority in International Application No. PCT/CA2016/050204 dated Jun. 1, 2016.

(Continued)

*Primary Examiner* — Michael A Keller
(74) *Attorney, Agent, or Firm* — Fish & Richardson P.C.

(57) ABSTRACT

The present disclosure involves systems, software, and computer-implemented methods for reconciling application assignments of different types to users and devices, and associating appropriate licenses for the applications to the users from purchase accounts managed by an external application store. An example method includes identifying a change in an assignment configuration for a user, the assignment configuration including a plurality of assignments of an application to the user; determining a winning assignment from the plurality of assignments; in response to determining the winning assignment, determining that the winning assignment requires a change to an external application store; and in response to determining that the winning assignment requires a change to the external application store, instructing the external application store to perform a configuration change corresponding to the winning assignment.

24 Claims, 6 Drawing Sheets

500

502 Identify a new assignment of an application to a user including a new purchase account 504 Determine that the user has been previously associated with the application by a previous assignment including a previous purchase account 506 Determine that the assignment type for the new assignment has a higher priority than the assignment type for the previous assignment 508 Instruct an application store to disassociate the previous license from the previous purchase account for the application from the user 510 Instruct the application store to associate a new license with the user from the new purchase account

(56) References Cited

U.S. PATENT DOCUMENTS

2002/0129119 A1* 9/2002 Aoki .................... G06Q 10/10 709/217
2007/0198427 A1 8/2007 Vajjiravel et al.
2007/0198428 A1 8/2007 Satkunanathan
2008/0005032 A1 1/2008 Znidarsic
2008/0015888 A1 1/2008 Dang
2008/0209569 A1 8/2008 Araki
2008/0244754 A1 10/2008 Curren
2009/0037287 A1 2/2009 Baitalmal et al.
2009/0119779 A1 5/2009 Dean
2009/0298478 A1 12/2009 Tyhurst
2010/0250389 A1 9/2010 Augustin et al.
2011/0055904 A1* 3/2011 Tsutsumi ................ G06F 21/10 726/4
2011/0106875 A1 5/2011 Koenig
2011/0252415 A1 10/2011 Ricci
2012/0011069 A1 1/2012 Kazawa
2012/0210442 A1 8/2012 Ito
2013/0091582 A1 4/2013 Chen
2013/0132235 A1* 5/2013 Gandhi .............. G06Q 30/0601 705/26.41
2013/0144633 A1 6/2013 Guadarrama et al.
2013/0198734 A1* 8/2013 Biswas ................. G06F 21/105 717/174
2013/0198864 A1 8/2013 Li et al.
2013/0247209 A1 9/2013 Didcock et al.
2014/0039982 A1* 2/2014 Oberhagemann .... G06Q 50/184 705/7.35
2014/0337924 A1 11/2014 Smith
2015/0026673 A1* 1/2015 Shetty ...................... G06F 8/61 717/174
2015/0026825 A1* 1/2015 Dube ...................... G06F 21/10 726/28
2015/0120784 A1 4/2015 Satoh
2015/0235039 A1 8/2015 Yoshinari
2015/0271177 A1* 9/2015 Mun .................. H04L 63/0853 726/7
2015/0281332 A1 10/2015 Naito et al.
2016/0125174 A1 5/2016 Matsushima
2016/0142511 A1 5/2016 Smith

OTHER PUBLICATIONS

Extended European Search Report issued in European Application No. 16157484.3 dated Jun. 22, 2016.

International Search Report and Written Opinion issued by International Searching Authority in International Application No. PCT/US2015/059229 dated Jan. 27, 2016.

* cited by examiner

APPLICATION ASSIGNMENT RECONCILIATION AND LICENSE MANAGEMENT

CLAIM OF PRIORITY

This application claims priority under 35 USC § 119(e) to U.S. Patent Application Ser. No. 62/079,404, filed on Nov. 13, 2014, the entire contents of which are hereby incorporated by reference.

BACKGROUND

The present disclosure involves systems, software, and computer-implemented methods for reconciling application assignments of different types to users and devices, and associating appropriate licenses for the applications to the users from purchase accounts managed by an external application store.

Application stores allow users to download software applications to devices electronically over a network. In some cases, the application stores may manage licenses associated with the applications and present End-User License Agreements (EULAs) to the user electronically for acceptance. Users generally register an account with a particular application store, allowing them to purchase and download software applications from the particular application store.

SUMMARY

The present disclosure involves systems, software, and computer-implemented methods for reconciling application assignments of different types to users and devices, and associating appropriate licenses for the applications to the users from purchase accounts managed by an external application store. One example method includes identifying a new assignment of an application to a user including a new purchase account; determining that the user has been previously associated with the application by a previous assignment including a previous purchase account different than the new purchase account; in response to determining that the user has been previously associated with the application, determining that a new assignment type for the new assignment has a higher priority than a previous assignment type for the previous assignment; and in response to determining that the new assignment type has higher priority than the previous assignment type: instructing an external application store to disassociate a previous license for the application from the user, the previous license associated with the previous purchase account; and instructing the external application store to associate a new license with the user, the new license selected from one or more of licenses for the application associated with the new purchase account.

Another example method includes identifying a change in an assignment configuration for a user, the assignment configuration including a plurality of assignments of an application to the user; determining a winning assignment from the plurality of assignments; in response to determining the winning assignment, determining that the winning assignment requires a change to an external application store; and in response to determining that the winning assignment requires a change to the external application store, instructing the external application store to perform a configuration change corresponding to the winning assignment.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Figure 1:
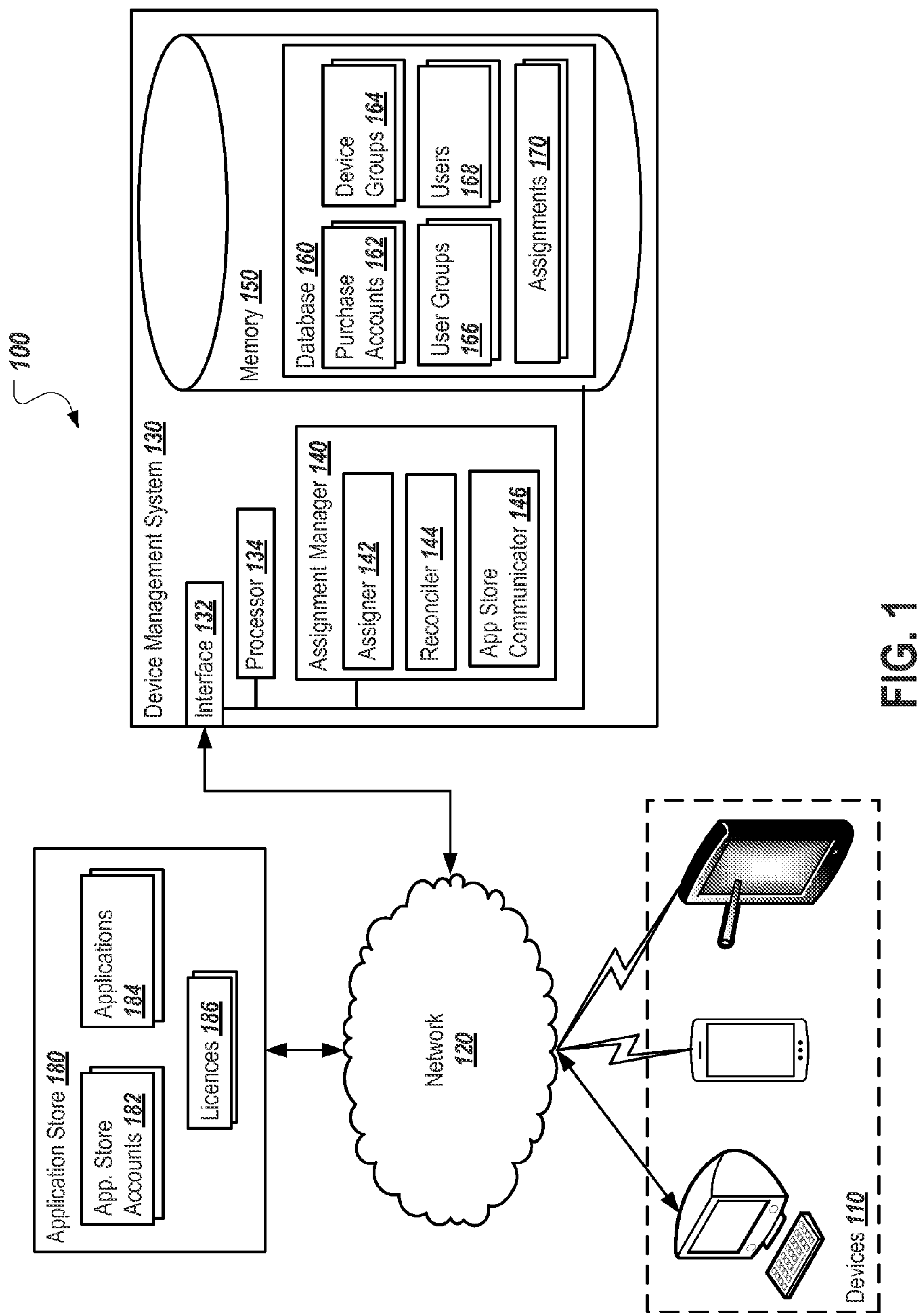
FIG. 1 is a block diagram illustrating an example environment for reconciling application assignments of different types to users according to a hierarchy, and associating appropriate licenses for the applications to the users from purchase accounts managed by an external application store.

In corporate and other internal networks, device management systems (e.g., mobile device management (MDM) systems) may manage assignments of software applications to users and devices. For example, an administrator may configure such a system to assign a particular software application to a particular group of users, and may specify that the users in the group are required to install the particular software application. The device management may implement such an assignment, such as, for example, by allocating a license for the particular software application to each user in the group. The system may also enforce the installation requirement, such as, for example, by quarantining or isolating devices on the network associated with users from the group that have not installed the particular software application.

As discussed above, software applications may be hosted and managed by external application stores. In some cases, these application stores may provide external systems, such as device management systems, access via an Application Programming Interface (API) to allow the registration of accounts, the purchase and allocation of licenses, and other functionality. Application stores may also offer bulk licensing functionality, where a single account (e.g., a purchase account) may purchase a plurality of licenses for an application and assign the licenses to users associated with the purchase account.

The present disclosure describes techniques for reconciling application assignments of different types to users and devices and associating appropriate licenses for the applications to the users from purchase accounts managed by an external application store. One example method includes identifying a change in the assignment configuration of an application to a user including a particular purchase account having licenses for the assigned application. A determination is made that the user has been previously associated with the application by a previous assignment under a different purchase account. The two assignments are reconciled based on assignment type to determine which has a higher priority. In the case that the previous assignment is higher priority, the configuration of the user is maintained and the new assignment is not implemented. Otherwise, an external application store is instructed to disassociate a previous license for the application from the user (if one is associated). The external application store is then instructed to associate a new license with the user from a group of licenses for the application associated with the new purchase account. In some cases, this instruction may occur in response to the user requesting to install the application and after the user has accepted an EULA.

Another example method includes identifying a change in an assignment configuration for a user, the assignment configuration including a plurality of assignments of an application to the user. A winning assignment (e.g., an assignment from the plurality of assignments that takes precedence over all others) is then determined from the plurality of assignments. A determination is then made that the winning assignment requires a change to an external application store. In response the external application store is instructed to perform a configuration change corresponding to the winning assignment.

Implementations according to the present disclosure may provide several advantages. By managing the assignment of applications to users externally from the application store, greater flexibility in the mechanisms for application assignment may be realized. For example, a network administrator may take advantage of different types of application assignments (e.g., to devices or device groups, to user groups, etc.) that may not be available through the application store. Further, existing processes for managing application assignments in a device management system may be utilized, and the application store may be updated by the device management system when configuration changes warrant such an update. Administrators may also avoid having to manage licenses manually within a device management system, as the techniques described herein may update the license and purchase account configuration of the external application automatically in response to an application assignment change. In addition, the techniques described herein may associate licenses on demand in response to user requests to install application, meaning that administrators may assign an application to more users than they have purchased licenses for. This allows efficient use of licenses, as only users that actually request to install the application may be allocated a license.

The present techniques may also allow flexible control of the allocation of users to purchase accounts. For example, users within a user group for a particular department of a company may be allocated to a purchase account for that particular department, allowing for spending on licenses to be tracked and controlled within an organization by department or by other criteria. Licenses may also be reclaimed (e.g., disassociated) from a user when the user's assignment configuration no longer allows access to the application.

FIG. 1 is a block diagram illustrating an example environment 100 for reconciling application assignments of different types to users and devices and associating appropriate licenses for the applications to the users from purchase accounts managed by an external application store. The environment 100 includes a device management system 130 connected to an application store 180 and one or more devices 110 by a network 120. In operation, the device management system 130 is configured to assign applications 184 hosted by the application store accounts 182 to users 168 of the one or more devices 110. The device management system 130 may assign the applications 184 in multiple ways, including directly to the particular users 168, to user groups 166 including portions of the users 168, and to device groups 164. The applications 184 may also be included in application groups (not shown) including multiple applications that may be assigned. In some cases, an application 184 may be assigned to the same user in multiple ways. The device management system 130 may be operable to determine which of the assignments has a higher priority and to implement a higher priority application assignment if necessary. Applications may also be assigned globally (e.g., to all users 168), which may be treated as the lowest priority type of assignment (e.g., taking precedence over no other type). The device management system 130 may communicate with the application store 182 and associate licenses 186 for the applications 184 to the appropriate users 168 in response to application assignments 170 based on purchase accounts 162 associated with the assignments, or based on requests to install the applications 184. The device management system 130 may also deliver EULAs to the users 168 for applications, such as, for example, through an application catalog (discussed below).

The device management system 130 may register application store accounts 182 for users 168 that are assigned applications 184 using an API provided by the application store 180. Device management system 130 may also disassociate licenses 186 from application store accounts 182 associated with the users 168 in response to applications being unassigned from the users 168, or in response to a higher priority assignment of the application taking precedence over the current assignment, as described in FIGS. 3 and 4. The device management system 130 may also associate licenses 186 to the application store accounts 182 in response to users 168 corresponding to the accounts requesting to install applications 184 corresponding to the licenses 186 from the application store 180. The association and disassociation of licenses 186 may be based on purchase accounts 162 associated with the licenses 186 and specified in the assignment of the applications 184 to the users 168. For example, a license 186 for an application 184 may be associated to a user 168 in response to the user 168 being assigned an application 184 under a purchase account 162 associated with the license 186.

The environment 100 includes the network 120. In some implementations, the network 120 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA, or any other suitable wireless networking technology. In such implementations, the wireless network may be a public network in the sense that any device within range may connect to the network. Even though any device within range may connect to the network 120 in such configurations, the device still may be required to authenticate in order to access resources on the network 120 and/or on the Internet. In some implementations, the entity that controls the network 120 may issue devices to users for use on the network 120. The network 120 may also be a wired network, such as an Ethernet network.

Device management system 130 is connected to the network 120. In some cases, the device management system 130 may be a computing device or set of computing devices operable to manage configuration attributes, enforce policies, and perform other operations related to the devices 110 connected to the network 120. In some implementations, the device management system 130 may be a mobile device management (MDM) system for managing wireless devices such as, for example, phones, tablets, laptops, or other devices.

In the present disclosure, the term "computing device" is intended to encompass any suitable processing device. For example, although FIG. 1 illustrates a device management system 130, the environment 100 can be implemented using two or more servers, as well as computers other than servers, including a server pool. Indeed, device management system 130 may be any computer or processing device such as, for example, a blade server, general-purpose personal computer (PC), a UNIX-based workstation, or any other suitable device. In other words, the present disclosure contemplates computing devices other than general purpose computers, as well as computing devices without conventional operating systems. Further, the device management system 130 may be adapted to execute any operating system, including LINUX, UNIX, Berkeley Software Distribution (BSD), or other operating systems.

The device management system 130 also includes an interface 132, a processor 134, and a memory 150. The interface 132 is used by the device management system 130 for communicating with other systems connected to the network 120; for example, the application store 180, the devices 110, as well as other systems communicably coupled to the network 120 (not illustrated). Generally, the interface 132 comprises logic encoded in software and/or hardware in a suitable combination and operable to communicate with the network 120. More specifically, the interface 132 may comprise software supporting one or more communication protocols associated with communications such that the network 120 or the interface's hardware is operable to communicate physical signals within and outside of the illustrated environment 100.

As illustrated in FIG. 1, the device management system 130 includes a processor 134. Although illustrated as a single processor 134 in FIG. 1, two or more processors may be used according to particular needs, desires, or particular implementations of environment 100. Each processor 134 may be a central processing unit (CPU), a blade, an application-specific integrated circuit (ASIC), a field-programmable gate array (FPGA), or another suitable component. Generally, the processor 134 executes instructions and manipulates data to perform the operations of the device management system 130.

The device management system 130 includes an assignment manager 140. The assignment manager 140 may be a software application executed by the device management system 130 operable to identify application assignments, such as requests from administrators, determine the effect of the application assignments on its configuration, update the database 160 with changes to the configuration, and communicate with the application store 180 to implement the changes if necessary. These operations are described in greater detail relative to the assigner 142, the reconciler 144, and the application store communicator 146 included in the assignment manager 140 (discussed below).

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in one or more programming languages including, but not limited to, C, C++, PERL, PYTHON, assembly language, or other programming languages. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components may be combined into single components as appropriate.

The assignment manager 140 includes the assigner 142. The assigner 142 may be a software application or module operable to process assignments of applications 184 or application groups to device groups 164, user groups 166, or users 168. In some cases, the assigner 142 may present a management interface (such as a webpage) through which administrators can assign or unassign applications to and from device groups 164, user groups 166, or users 168. The assigner 142 may also provide access to this functionality through an API. In some implementations, the assigner 142 may create assignments 170 in the database 160 to record the assignment or unassignment of applications.

The assignment manager 140 also includes the reconciler 144. The reconciler 144 may be a software application or module operable to determine which assignment takes precedence when multiple assignments have the effect of assigning the same application 184 to the same user 168. In some cases, the reconciler 144 may analyze all assignments of an application 184 to a user 168 according to the techniques described above to determine an assignment that takes precedence for the user (e.g., the winning assignment) given the current assignment configuration. For example, a user 168 may be included in a user group 166. An application may be assigned directly to the user 168 under a particular purchase account 162, and to the user group 166 including the user 168 under a different purchase account 162. In such a case, the reconciler 144 may determine which of these two conflicting assignments should be implemented. In some implementations, the reconciler 144 determines assignment precedence using a hierarchy of assignment types wherein a device group assignment takes precedence over user group assignments and direct user assignments, a direct user assignment takes precedence over a user group assignment, and a user group assignment does not take precedence over any other type besides a global assignment of an application (e.g., to all users). A global assignment does not take precedence over any other type.

In some cases, the reconciler 144 may resolve conflicting assignments of the same type for device groups 164 and user groups 166 based on precedence indicators associated with the individual device groups 164 and user groups 166. For example, if device group "A" has a precedence indicator of 5, and device group "B" has a precedence indicator of 2, the reconciler 144 may determine that an assignment to device group "A" takes precedence over an assignment to device group "B" due to its higher precedence indicator. The reconciler may also determine assignment precedence based on other attributes of the assignment, such as a disposition (e.g., mandatory or optional) of the application.

The assignment manager 140 also includes the application store communicator 146. The application store communicator 146 may be a software application or module operable to communicate with or instruct the application store 180 to implement changes in the assignment configuration. The application store communicator 146 may communicate with the application store 180 via a web services API provided by the application store 180 over the network 120. Note that although the application store 180 is shown connected to the network 120, in some cases, the application store 180 is connected to an external network, such as the Internet, that is in turn connected to the network 120.

In some implementations, the application store communicator 146 may communicate with the application store 180 in response to results produced by the reconciler 144. For example, if the reconciler 144 determines that a new assignment of application 184 to a user 168 under a new purchase account 162 takes precedence over a previous assignment of the application 194 to the user 168 under a previous purchase account 162, the application store communicator 146 may instruct the application store 182 disassociate a license 186 for the application 184 associated with the previous purchase account 162 from an application store account 182 associated with the user 168. The application store communicator 146 may then associate the application store account 182 associated with the user 168 with the new purchase account 162 if it has not been previously associated. In response to receiving an indication from the application store 180 that the device 110 is associated with the user 168 as requested to install the application 184, the application store communicator 146 may instruct the application store 182 to associate a license 186 for the application 184 from the new purchase account 162 with the user 168. In some cases, the application store communicator 146 may register a new application store account 182 for the user 168 if one has not been previously registered.

In some cases, the application store communicator 146 may obtain information from the application store 180 regarding its current configuration for a particular purchase account 162, including, but not limited to, applications to which the purchase account 162 has licenses, available and used license counts for the applications, or other information. This information may be used in rendering administrative views and may otherwise drive workflows for assigning applications. In some cases, the information may be used by the reconciler 144 to determine assignment precedence, such as, for example, by giving precedence to assignments associated with purchase accounts that have available licenses for the application.

The device management system 130 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component.

Memory 150 includes a database 160. The database 160 may include a data set managed by a database management system, such as, for example, MYSQL, INGRES, POSTGRESQL, or other database management systems. In some cases, the database 160 may be a distributed database including multiple computing devices storing portions of the data set and communicating over a network. Database 160 may be operable to process queries specified in any structured or other query language such as, for example, Structured Query Language (SQL).

Database 160 includes purchase accounts 162. The purchase accounts 162 may correspond to application store accounts 182 under which multiple licenses 186 have been purchased from the application store 180. For example, a company may set up a purchase account 162 and purchase a block of 1000 licenses for a particular application 184. The company may then assign these licenses to users 168 that will use the particular application 184. In some implementations, a purchase account 162 is associated with a set of redemption codes provided by the application store 180, with each redemption code corresponding to a license purchased under the purchase account 162. The device management system 130 may provide the redemption codes to users 168 that are assigned the particular application 184. For example, the device management system 130 may provide a uniform resource locator (URL) including the redemption code and associated with the application store 180 to the users 168 in order to download the application 184. The application store 180 may match the redemption code in the URL with its associated license 186, and associate the license 186 with the user 168 that submitted the request for the URL in order to download the application 184.

The database 160 also includes device groups 164. The device groups 164 may include criteria identifying a group of devices 110. An assignment of application 184 to the device group 164 may have the effect of assigning the application 184 two users 168 associated with the devices 110 that meet the criteria identifying the device group 164. For example, a device group 164 may include a criteria indicating that devices 110 having a hardware version greater than "7.0" are included in the device group 164. If the user 168 is associated with the device having a hardware version of "7.1," an assignment of an application 184 to the device group 164 would have the effect of assigning the application 184 to the user 168. Criteria for defining a device group 164 may include, but are not limited to, processor speed, operating system version, amount of storage space, network connectivity speed or type, screen resolution, device type, or other criteria or combinations of criteria.

Database 160 also includes user groups 166. Each user group 166 includes a plurality of users 168. Assignment of an application 184 to a user group 166 will have the effect of assigning the application to all users 168 in the group (subject to the assignment precedence limitations described above). The database 160 also includes users 168. In some implementations, the users 168 may be associated with globally unique identifiers (GUIDs) that identify particular users within the device management system 130. In some cases, a GUID for a particular user may be associated with the user's application store account within the application store 180. The GUID may also be included in the text of the user's application store account identifier to associate the user and the application store account (e.g., "johnsmith1827637485811@appstore.com", where "1827637485811" is the GUID).

The environment 100 also includes an application store 180. As previously described, the application store 180 may be a computing device or set of computing devices external to the device management system 130 offering software applications 184 for purchase and download. The application store 180 may store the applications 184 and may allow the devices 110 to download requested applications in response to the successful purchase or under a purchase account 162 managed by the device manager system 130, such as, for example, when a license is associated for that user, application, and purchase account. The application store accounts 182 may be unique accounts created by the application store 180 in response to user registration.

The application store 180 also includes licenses 186. The licenses 186 represent instances of a particular application to be associated with users, and are purchased under and associated with the purchase accounts 162. The licenses may be associated with EULAs to be executed between a user requesting to download a particular application 184 and the developer or owner of the application 184, the application store 180 itself, or both. In some cases, the application store 180 may display the EULA to the user when the user requests to download the particular application 184. The application store 180 may also require that the user accept the license 186, such as by clicking the accept button indicating that the user has read the text of the license 186. In some cases, the conditions of registering an account with the application store 180 may stipulate that requesting to download a particular application 184 constitutes acceptance of the associated license 186.

The application store 180 may manage sets of licenses purchased under the purchase accounts 162 and may allow an owner of a particular purchase account 162 (e.g., identified by unique token associated with the purchase account) to associate and disassociate licenses 186 from the purchase account 162 to application store accounts 182 to allow the user 168 to download and install the application 184 associated with the license 186.

Figure 2:
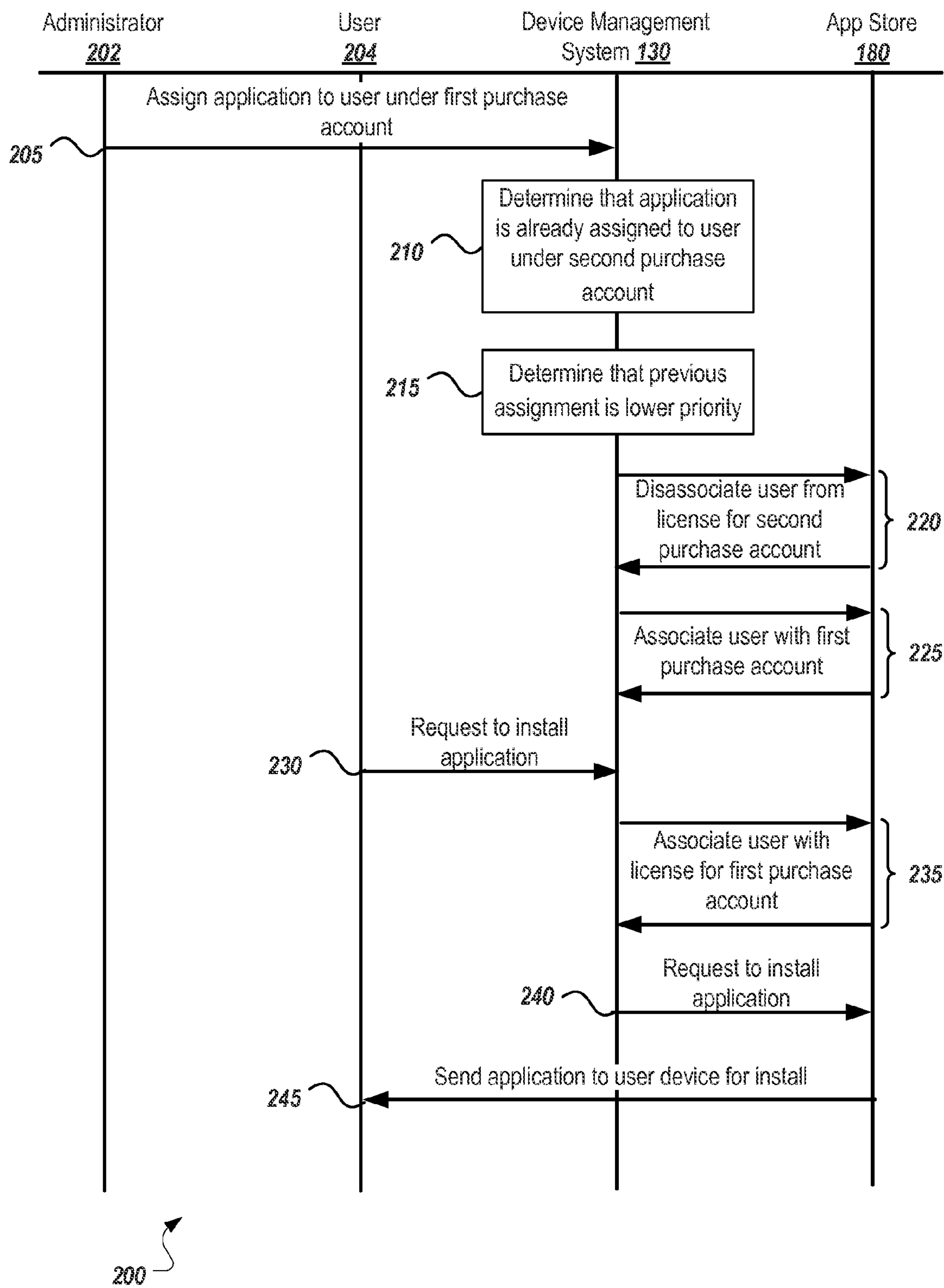
FIG. 2 is a message flow diagram illustrating an example process for reconciling application assignments and associating appropriate licenses.

FIG. 2 is a message flow diagram 200 illustrating an example process for reconciling application assignments and associating appropriate licenses. At 205, an administrator 202 of the device management system 130 assigns an application to a user of device 110 under a first purchase account. At 210, the device management system 130 determines that the application is already assigned to the user under a second purchase account different than the first purchase account. At 215, the device management system 130 determines that the previous assignment of the application to the user is of lower priority (i.e., does not take precedence) over the assignment at 205. This determination may be performed as described above relative to FIG. 1, or as described relative to FIGS. 3 and 4.

At 220, the device management system 130 interacts with the application store 180 to disassociate the user from a license for the application provided by the second purchase account. If no license is associated, the step 220 may be skipped. At 225, the device management system interacts with the application store 182 to associate the user with the first purchase account. This operation may be performed if the user has not been previously associated with the first purchase account.

At 230, the device 110 sends a request to install the application to the device management system 130. In some implementations, this request may be generated by the user activating a link representing an invitation URL provided by the device management system 130 including an invitation code associated with the assigned application. For example, the device management system 130 may present an application catalog to the user including applications to which they are assigned accompanied by links including the invitation URL for each application for the particular purchase account. In some cases, the invitation code may be provided by the application store 180 in response to a user being associated with a particular purchase account.

At 235, the device management system 130 interacts with the application store 180 to associate the user with a license for the application from the first purchase account.

At 240, the device management system 130 forwards the user request to install the application to the application store 180. At 245, the application store 180 sends the application to the device 110 for installation. In some cases, the application may be stored by the device management system 130, in which case the device management system 130 provides the application to the device 110 without requesting it from the application store 180. In some cases, the device management system 130 sends an install command to the device 110, and the device either automatically installs by communicating with the application store 180 directly or does so after the user accepts an install confirmation prompt.

Figure 3:
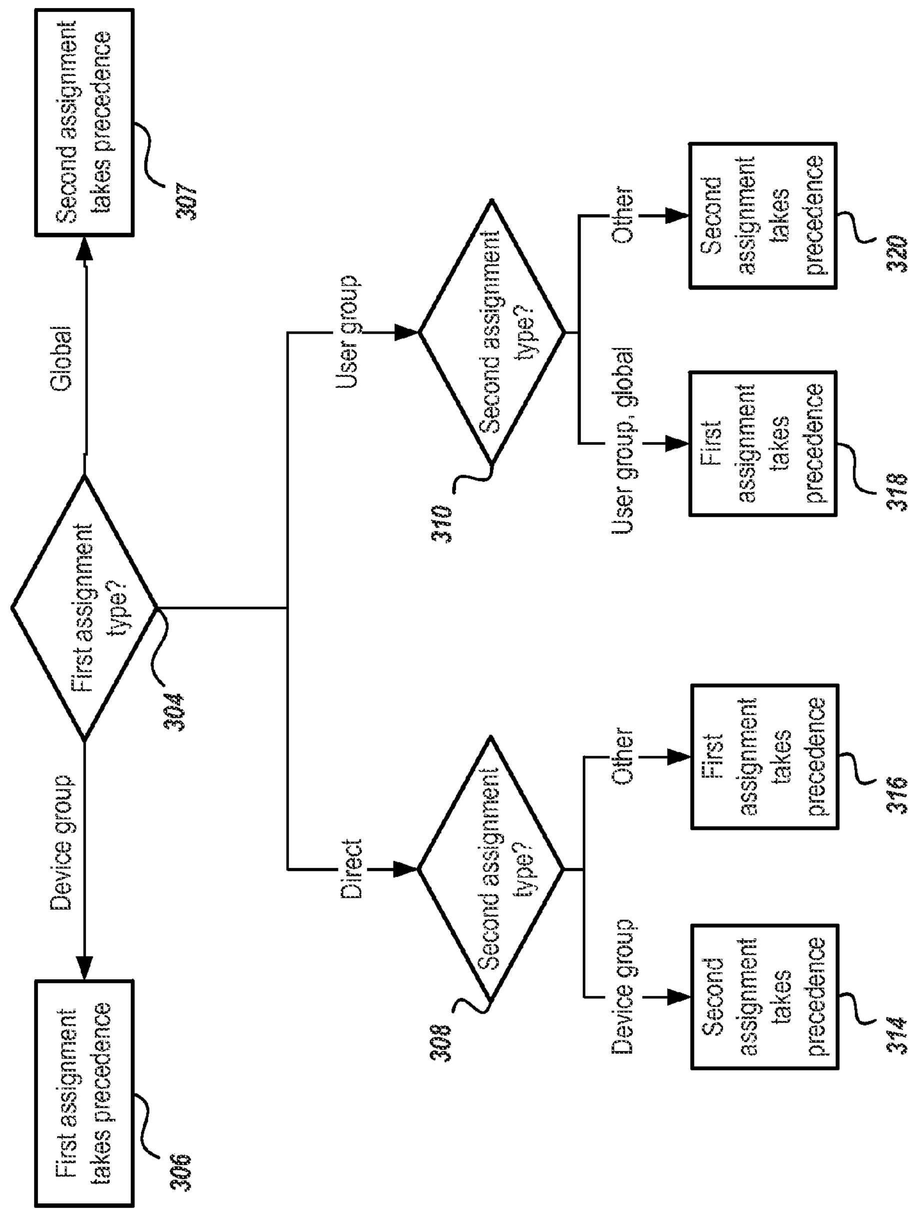
FIG. 3 is a flow chart illustrating an example process for reconciling application assignments based on assignment type.

FIG. 3 is a flow chart illustrating an example process 300 for reconciling application assignments based on assignment type. In some implementations, the process 300 may be used by the reconciler 144 to compare a first assignment to a second assignment and determine which assignment takes precedence. The process 300 may be repeated for all configured assignments to determine a winning assignment (e.g., an assignment that takes precedence over all other configured assignments).

At 304, the process 300 branches based on the assignment type of the first assignment. If the first assignment is a device group assignment, the process 300 proceeds to 306, and the first assignment takes precedence over the second. In some implementations, precedence may be determined based on the device group precedence indicators discussed relative to FIG. 1.

If the first assignment is a global assignment, the process 300 proceeds to 307, and the second assignment takes precedence over the first. In some implementations, precedence may be determined based on the precedence indicators discussed relative to FIG. 1 (e.g., when the first and second assignment are both global).

If the first assignment is a direct assignment to the user, the process 300 proceeds to 308, where the second assignment type is determined. If the second assignment is a device group assignment, the process 300 proceeds to 314, and the second assignment takes precedence. For all other assignment types, the process proceeds to 316, and the first assignment takes precedence.

If the first assignment is an assignment to a user group including the user, the process 300 proceeds to 310, and the second assignment type is determined. If the second assignment is a user group assignment, the process 300 proceeds to 318, and the first assignment is given precedence. In some cases, precedence may be based on the user group precedence indicators discussed relative to FIG. 1. For all other second assignment types, the process 300 proceeds to 320, and the second assignment takes precedence.

Figure 4:
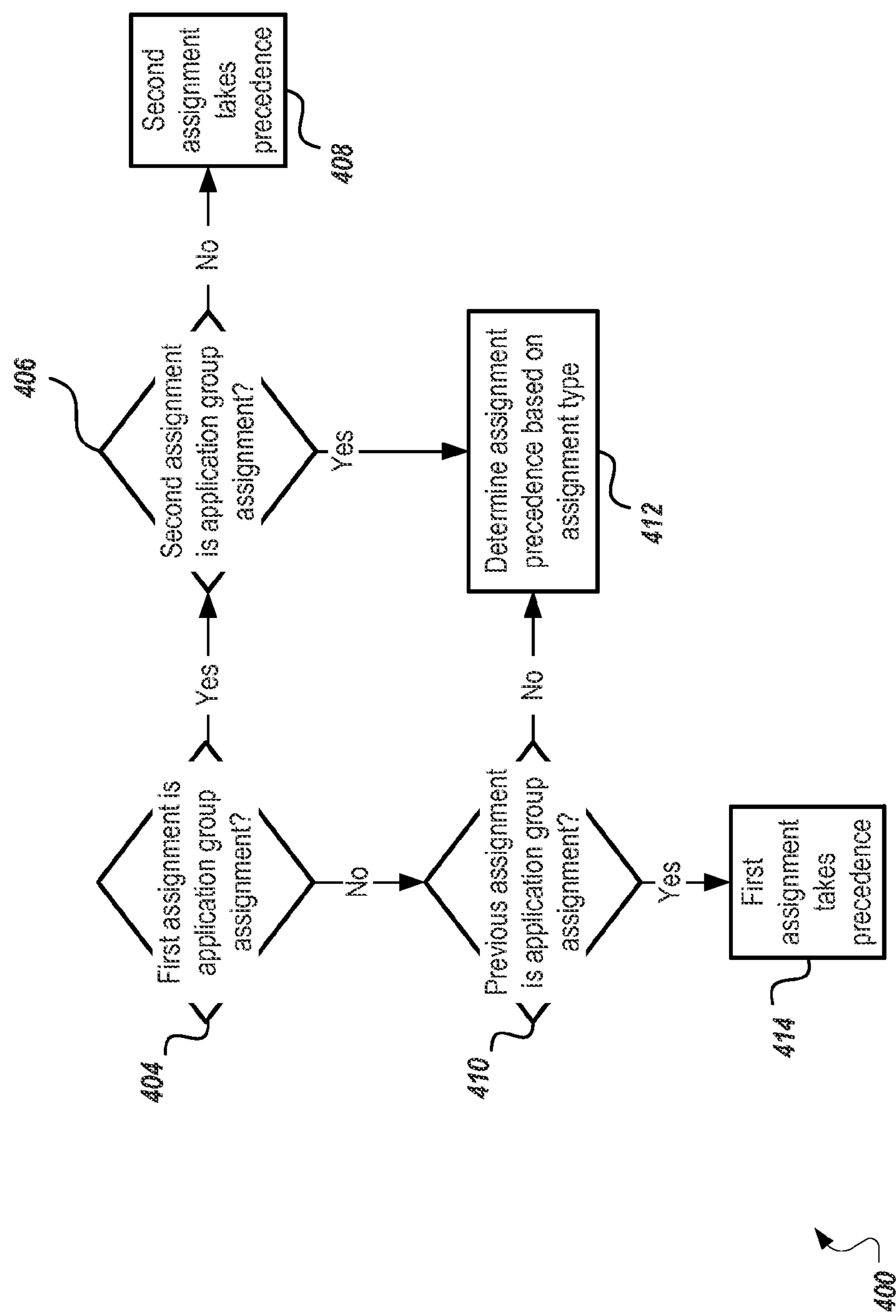
FIG. 4 is flow chart showing an example process 400 for reconciling application group assignments between a first assignment and a second assignment.

FIG. 4 is flow chart showing an example process 400 for reconciling application group assignments between a first assignment and a second assignment. In some cases, the process 400 may be performed by the reconciler before the process 300, and the process 300 may be performed if the process 400 reaches step 412 (as described below).

At 404, a determination is made whether the first assignment is an application group assignment (e.g., an assignment of an application group including the application to the user). If the first assignment is an application group assignment, the process 400 proceeds to 406 and a determination is made whether the second assignment of the application to the user is also an application group assignment. If the second assignment is not an application group assignment, the process 400 continues to 408, and the second assignment takes precedence based on assignments of individual applications taking precedence over assignments of application groups. If the second assignment is an application group assignment, the process 400 continues to 412, and the assignment is conditionally performed based on the assignment type of the assignment in the previous assignment (e.g., process 300 from FIG. 3).

If the first assignment is not an application group assignment, process 400 continues to 410, and a determination is made whether the second assignment is an application group assignment. If the second assignment is an application group assignment, the process 400 continues to 414, and the first assignment takes precedence based on assignments of individual applications taking precedence over assignments of application groups. If the second assignment is not an application group assignment, the process 400 continues to 412, and assignment precedence is determined based on the assignment types of the first and second assignments (e.g., process 300 from FIG. 3).

Figure 5:
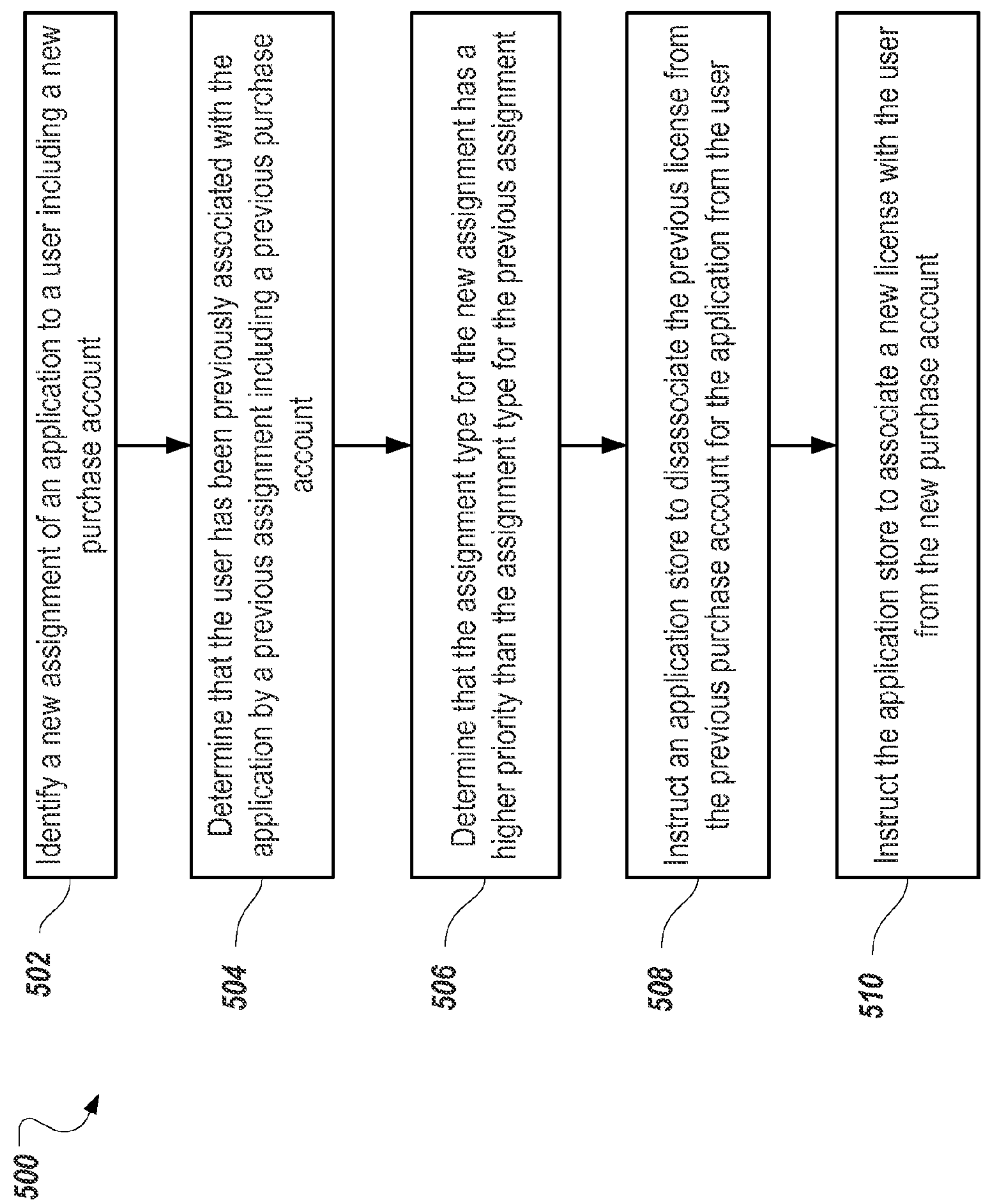
FIG. 5 is flow chart showing an example method 500 for reconciling application assignments and associating appropriate licenses.

FIG. 5 is flow chart showing an example method 500 for reconciling application assignments and associating appropriate licenses. At 502, a new assignment of an application to a user including a new purchase account is identified. At 504, a determination is made that the user has been previously associated with the application by a previous assignment including a previous purchase account. In some cases, the new assignment and the previous assignment include a disposition attribute designating the application as mandatory or optional.

At 506, a determination is made that the assignment type of the new assignment has a higher priority (e.g., higher precedence) than the assignment type for the previous assignment. In some cases, the new assignment and the previous assignment type each may include a device group assignment assigning the application to users associated with devices in the device group, a direct assignment assigning the application directly to the user, a user group assignment assigning the application to user groups including the user, or an application group assignment assigning the application to users to which the application group has been assigned. In some implementations, determining that the assignment type for the new assignment has the higher priority is based at least in part on a hierarchy of assignment types defining that assignment device group assignment has a highest priority, direct assignment has a second highest priority, user group assignment has a third highest priority, and global assignment has a fourth highest priority. In some cases, the device group assignment includes criteria defining devices within the device group, the criteria including at least one of: an operating system type, an operating system version, a device model, a device type, a minimum storage amount, a minimum processor speed, or a network connection type.

At 508, an application store is instructed to disassociate the previous license from the previous purchase account for the application from the user. At 510, the application stores are instructed to associate a new license with the user from the new purchase account. In some cases, instructing the application store to associate the new license with the user is performed in response to the user requesting to download the application. Instructing the application store to disassociate the previous license and associate the new license may be performed using a web services application programming interface (API) associated with the application store.

Figure 6:
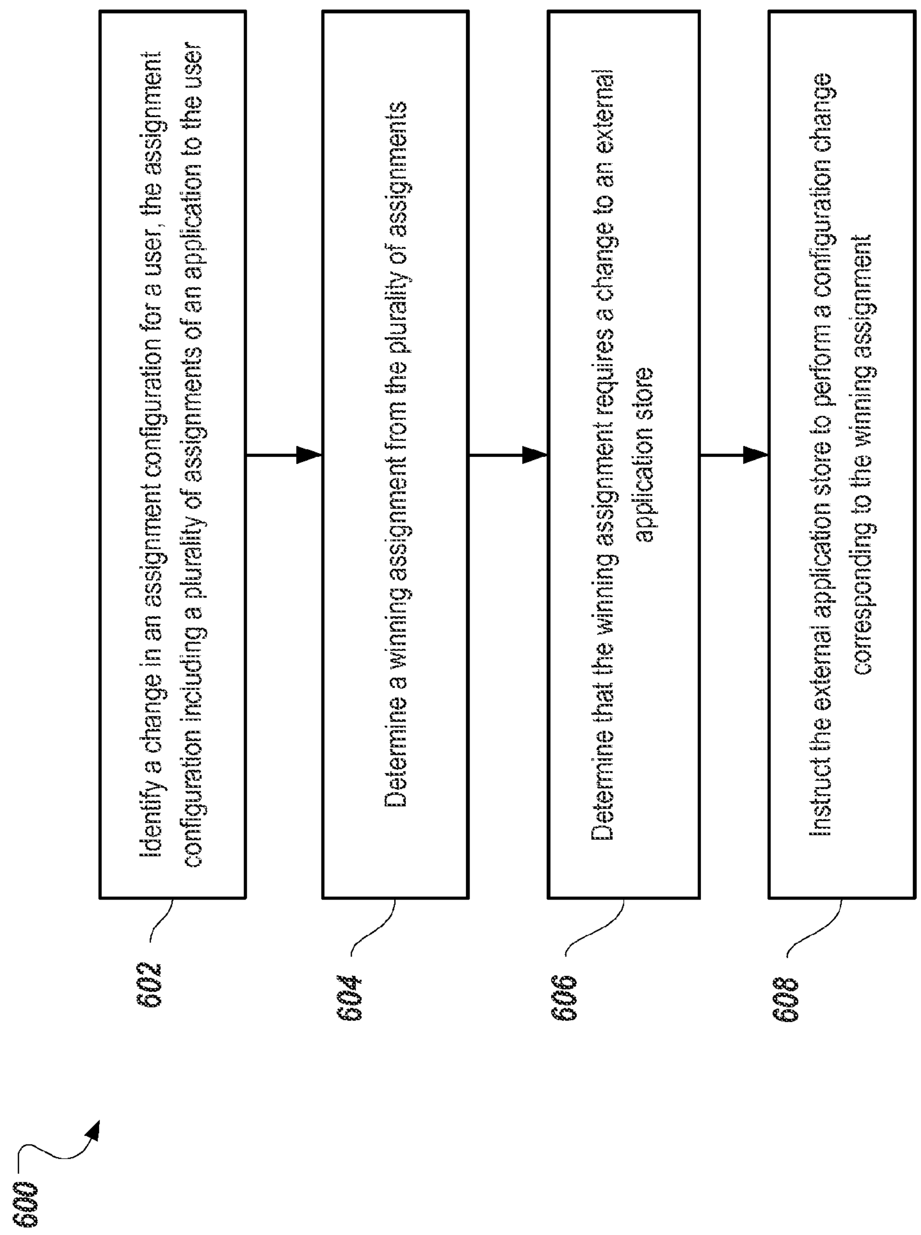
FIG. 6 is flow chart showing an example method for reconciling application assignments and associating appropriate licenses.

FIG. 6 is a flow chart of another example method 600 for reconciling application assignments and associating appropriate licenses. At 602, a change in an assignment configuration for a user is identified, the assignment configuration including a plurality of assignments of an application to the user. At 604, a winning assignment is determined from the plurality of assignments. At 606, in response to determining the winning assignment, a determination is made that the winning assignment requires a change to an external application store. At 608, in response to determining that the winning assignment requires a change to the external application store, the external application is instructed store to perform a configuration change corresponding to the winning assignment. The configuration change may include any of the instructions sent to the application store described herein, such as, for example, associating a license from a purchase account to a user, disassociating a license from a purchase account from a user, registering accounts for users, or any other change that can be made through a web services API provided by the application store or through or other mechanisms.

In some implementations, the user is associated with a device manager identifier associated with the device management system, and the method 500 includes in response to determining that the assignment type for the new assignment has higher priority than the assignment type for the previous assignment, and before instructing the application store to associate the new license with the user, instructing the application store to register a new application store identifier for the user, associate the new application store identifier with the device manager identifier for the user, and associate the new application store identifier with the new purchase account. The method 500 may also include, after receiving a response from the application store indicating that the new license for the application is associated with the user, generating an application catalog for presentation to the user including the new application. In some cases, instructing the application store to associate the new license with the user is performed in response to the user interacting with the application catalog to request to install the new application.

The preceding figures and accompanying description illustrate example processes and computer-implementable techniques. Environment 100 (or its software or other components) contemplates using, implementing, or executing any suitable technique for performing these and other tasks. These processes are for illustration purposes only, and the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more hardware processors of a device management server, the method comprising:

identifying, by the one or more hardware processors of the device management server, a new assignment of an application to a user using a new purchase account, wherein the new purchase account includes a first plurality of licenses for the application, and the user is associated with a device manager identifier associated with the device management server;

determining, by the one or more hardware processors of the device management server, that the user has been previously associated with the application by a previous assignment using a previous purchase account different than the new purchase account, wherein the previous purchase account includes a second plurality of licenses for the application, and the first plurality of licenses are different than the second plurality of licenses;

in response to determining that the user has been previously associated with the application, determining, by the one or more hardware processors of the device management server, that a new assignment type for the new assignment has a higher priority than a previous assignment type for the previous assignment, wherein each of the new assignment type and the previous assignment type includes a respective one of: a device group assignment assigning the application to users associated with devices in a device group, a direct assignment assigning the application directly to the user, a user group assignment assigning the application to user groups including the user, or a global assignment assigning the application to all users managed by the device management server, wherein the device group assignment has a highest priority, the direct assignment has a second highest priority, the user group assignment has a third highest priority, and the global assignment has a fourth highest priority; and in response to determining that the new assignment type has the higher priority than the previous assignment type:

transmitting a first instruction, from the one or more hardware processors of the device management server to an external application store, the first instruction instructing the external application store to disassociate a previous license for the application from the user, and the previous license selected from the second plurality of licenses for the application associated with the previous purchase account;

transmitting a second instruction, from the one or more hardware processors of the device management server to the external application store, the second instruction instructing the external application store to register a new application store identifier for the user, associate the new application store identifier with the device manager identifier for the user, and associate the new application store identifier with the new purchase account; and after transmitting the second instruction, transmitting a third instruction, from the one or more hardware processors of the device management server to the external application store, the third instruction instructing the external application store to associate a new license with the user, and the new license selected from the first plurality of licenses for the application associated with the new purchase account.

2. The method of claim 1, wherein the device group assignment includes criteria defining devices within the device group, the criteria including at least one of: an operating system type, an operating system version, a device model, a device type, a minimum storage amount, a minimum processor speed, or a network connection type.

3. The method of claim 1, wherein instructing the external application store to associate the new license with the user is performed in response to the user requesting to download the application.

4. The method of claim 1, wherein the new assignment and the previous assignment include a disposition attribute designating the application as mandatory or optional.

5. The method of claim 1, wherein instructing the external application store to disassociate the previous license and associate the new license are performed using a web services application programming interface (API) associated with the external application store.

6. The method of claim 1, further comprising generating an application catalog for presentation to the user including a new application.

7. The method of claim 6, wherein instructing the external application store to associate the new license with the user is performed in response to the user interacting with the application catalog to request to install the new application.

8. The method of claim 1, wherein the new assignment is a first assignment, the new purchase account is a first purchase account, and the new license is a first license, the method further comprising:

after instructing the external application store to associate the new license with the user, and in response to determining that a second assignment of the application to the user is associated with the first purchase account, maintaining an association of the first license for the application to the user.

9. A non-transitory, computer-readable medium storing instructions operable when executed to cause at least one hardware processor of a device management server to perform operations comprising:

identifying, by the at least one hardware processor of the device management server, a new assignment of an application to a user using a new purchase account, wherein the new purchase account includes a first plurality of licenses for the application, and the user is associated with a device manager identifier associated with the device management server;

determining, by the at least one hardware processor of the device management server, that the user has been previously associated with the application by a previous assignment using a previous purchase account different than the new purchase account, wherein the previous purchase account includes a second plurality of licenses for the application, and the first plurality of licenses are different than the second plurality of licenses;

in response to determining that the user has been previously associated with the application, determining, by the at least one hardware processor of the device management server, that a new assignment type for the new assignment has a higher priority than a previous assignment type for the previous assignment, wherein each of the new assignment type and the previous assignment type includes a respective one of: a device group assignment assigning the application to users associated with devices in a device group, a direct assignment assigning the application directly to the user, a user group assignment assigning the application to user groups including the user, or a global assignment assigning the application to all users managed by the device management server, wherein the device group assignment has a highest priority, the direct assignment has a second highest priority, the user group assignment has a third highest priority, and the global assignment has a fourth highest priority; and in response to determining that the new assignment type has the higher priority than the previous assignment type:

transmitting a first instruction, from the at least one hardware processor of the device management server to an external application store, the first instruction instructing the external application store to disassociate a previous license for the application from the user, and the previous license selected from the second plurality of licenses for the application associated with the previous purchase account;

transmitting a second instruction, from the one or more hardware processors of the device management server to the external application store, the second instruction instructing the external application store to register a new application store identifier for the user, associate the new application store identifier with the device manager identifier for the user, and associate the new application store identifier with the new purchase account; and after transmitting the second instruction, transmitting a third instruction, from the at least one hardware processor of the device management server to the external application store, the third instruction instructing the external application store to associate a new license with the user, and the new license selected from the first plurality of licenses for the application associated with the new purchase account.

10. The computer-readable medium of claim 9, wherein the device group assignment includes criteria defining devices within the device group, the criteria including at least one of: an operating system type, an operating system version, a device model, a device type, a minimum storage amount, a minimum processor speed, or a network connection type.

11. The computer-readable medium of claim 9, wherein instructing the external application store to associate the new license with the user is performed in response to the user requesting to download the application.

12. The computer-readable medium of claim 9, wherein the new assignment and the previous assignment include a disposition attribute designating the application as mandatory or optional.

13. The computer-readable medium of claim 9, wherein instructing the external application store to disassociate the previous license and associate the new license are performed using a web services application programming interface (API) associated with the external application store.

14. The computer-readable medium of claim 9, the operations further comprising generating an application catalog for presentation to the user including a new application.

15. The computer-readable medium of claim 14, wherein instructing the external application store to associate the new license with the user is performed in response to the user interacting with the application catalog to request to install the new application.

16. The computer-readable medium of claim 9, wherein the new assignment is a first assignment, the new purchase account is a first purchase account, and the new license is a first license, the operations further comprising:

after instructing the external application store to associate the new license with the user, and in response to determining that a second assignment of the application to the user is associated with the first purchase account, maintaining an association of the first license for the application to the user.

17. A system comprising:

memory for storing data; and one or more hardware processors of a device management server operable to perform operations comprising:

identifying, by the one or more hardware processors of the device management server, a new assignment of an application to a user using a new purchase account, wherein the new purchase account includes a first plurality of licenses for the application, and the user is associated with a device manager identifier associated with the device management server;

determining, by the one or more hardware processors of the device management server, that the user has been previously associated with the application by a previous assignment using a previous purchase account different than the new purchase account, wherein the previous purchase account includes a second plurality of licenses for the application, and the first plurality of licenses are different than the second plurality of licenses;

in response to determining that the user has been previously associated with the application, determining, by the one or more hardware processors of the device management server, that a new assignment type for the new assignment has a higher priority than a previous assignment type for the previous assignment, wherein each of the new assignment type and the previous assignment type includes a respective one of: a device group assignment assigning the application to users associated with devices in a device group, a direct assignment assigning the application directly to the user, a user group assignment assigning the application to user groups including the user, or a global assignment assigning the application to all users managed by the device management server, wherein the device group assignment has a highest priority, the direct assignment has a second highest priority, the user group assignment has a third highest priority, and the global assignment has a fourth highest priority; and in response to determining that the new assignment type has the higher priority than the previous assignment type:

transmitting a first instruction, from the one or more hardware processors of the device management server to an external application store, the first instruction instructing the external application store to disassociate a previous license for the application from the user, and the previous license selected from the second plurality of licenses for the application associated with the previous purchase account;

transmitting a second instruction, from the one or more hardware processors of the device management server to the external application store, the second instruction instructing the external application store to register a new application store identifier for the user, associate the new application store identifier with the device manager identifier for the user, and associate the new application store identifier with the new purchase account; and after transmitting the second instruction, transmitting a third instruction, from the one or more hardware processors of the device management server to the external application store, the third instruction instructing the external application store to associate a new license with the user, and the new license selected from the first plurality of licenses for the application associated with the new purchase account.

18. The system of claim 17, wherein the device group assignment includes criteria defining devices within the device group, the criteria including at least one of: an operating system type, an operating system version, a device model, a device type, a minimum storage amount, a minimum processor speed, or a network connection type.

19. The system of claim 17, wherein instructing the external application store to associate the new license with the user is performed in response to the user requesting to download the application.

20. The system of claim 17, wherein the new assignment and the previous assignment include a disposition attribute designating the application as mandatory or optional.

21. The system of claim 17, wherein instructing the external application store to disassociate the previous license and associate the new license are performed using a web services application programming interface (API) associated with the external application store.

22. The system of claim 17, the operations further comprising generating an application catalog for presentation to the user including a new application.

23. The system of claim 22, wherein instructing the external application store to associate the new license with the user is performed in response to the user interacting with the application catalog to request to install the new application.

24. The system of claim 17, wherein the new assignment is a first assignment, the new purchase account is a first purchase account, and the new license is a first license, the operations further comprising:

after instructing the external application store to associate the new license with the user, and in response to determining that a second assignment of the application to the user is associated with the first purchase account, maintaining an association of the first license for the application to the user.

* * * * *